(12) United States Patent
Hasegawa

(10) Patent No.: US 6,490,503 B1
(45) Date of Patent: Dec. 3, 2002

(54) CONTROL DEVICE AND METHOD THEREFOR, INFORMATION PROCESSING DEVICE AND METHOD THEREFOR, AND MEDIUM

(75) Inventor: Rika Hasegawa, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/743,368

(22) PCT Filed: May 10, 2000

(86) PCT No.: PCT/JP00/02982

§ 371 (c)(1),
(2), (4) Date: Jan. 9, 2001

(87) PCT Pub. No.: WO00/68932

PCT Pub. Date: Nov. 16, 2000

(30) Foreign Application Priority Data

May 10, 1999  (JP) .......................................... 11-128457

(51) Int. Cl.$^7$ .............................................. G06F 19/00
(52) U.S. Cl. ........................... 700/245; 700/69; 701/23; 701/301; 318/587; 706/909
(58) Field of Search ..................... 700/245, 69; 701/23, 701/301; 446/175, 298, 302, 23, 91, 299, 477; 706/900; 318/587; 84/262, 645, 600, 622, 625, 659, 654

(56) References Cited

U.S. PATENT DOCUMENTS 5,163,001 A * 11/1992 Luke, Jr. ...................... 701/23
5,285,380 A *  2/1994 Payton ......................... 700/69
6,206,745 B1 *  3/2001 Gabai et al. .................. 446/91
6,290,566 B1 *  9/2001 Gabai et al. ................. 446/175
RE37,654 E  *  4/2002 Longo .......................... 84/600

FOREIGN PATENT DOCUMENTS

GB  2 165 974     4/1986
JP    7-97277    10/1995

OTHER PUBLICATIONS

Reuters, Sony confident about personal robot's fure, 2001, Internet.*
Kobayashi et al., "Study on a Method of Understanding Human Intention by Using the Sound", Proceedings distributed at Lecture Meeting on Robotics—Mechatronics in 1997 prepared by Japan Machinery Society, vol. B, 8P2–110, pp. 975–976, Jun. 7, 1997.

* cited by examiner

Primary Examiner—Jacques H. Louis-Jacques
Assistant Examiner—McDieunel Marc
(74) Attorney, Agent, or Firm—Frommer Lawrence & Haug LLP; William S. Frommer

(57) ABSTRACT

There is provided a control apparatus adapted to easily and securely plural robots in an individual manner so that they can be controlled. In more practical sense, when one robot unit is controlled, a slide button 52 is switched to the module A side. When the other robot unit is controlled, such button is switched to the module B side. When a button 51 caused to correspond to sound name is operated, sound corresponding to that sound name is outputted at sound pitch corresponding to switching position of the slide button 52, and robot is controlled by that sound. Respective robots take thereinto only audio signals of sound pitches corresponding thereto.

16 Claims, 19 Drawing Sheets

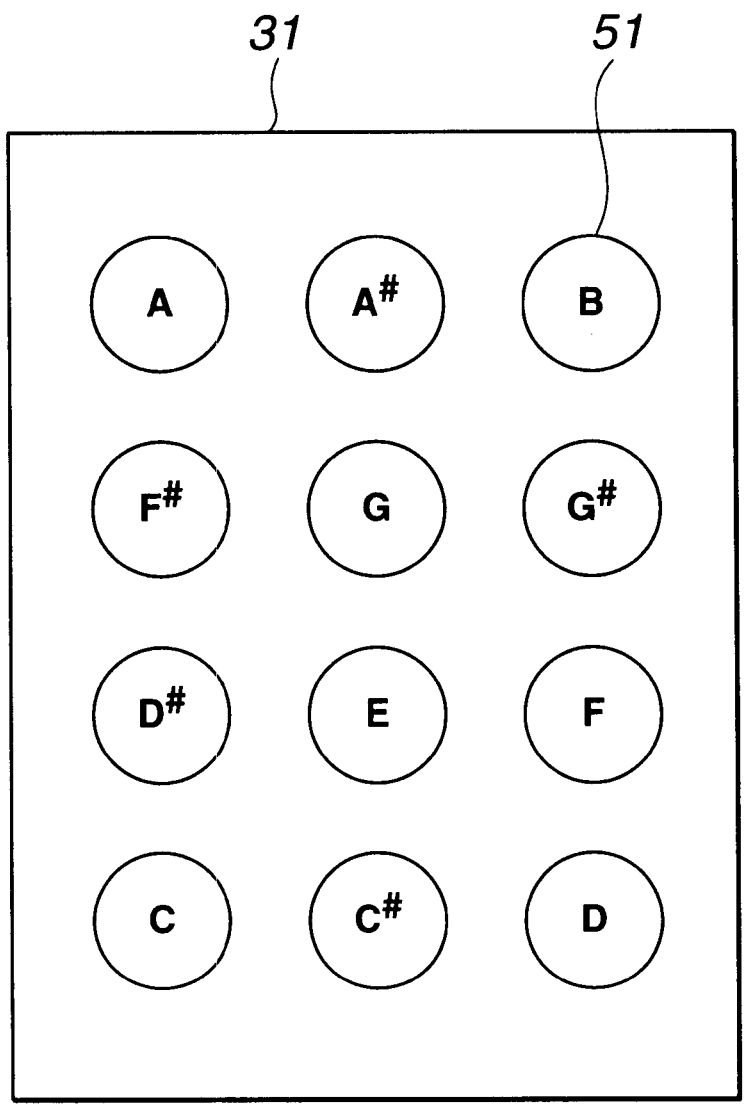 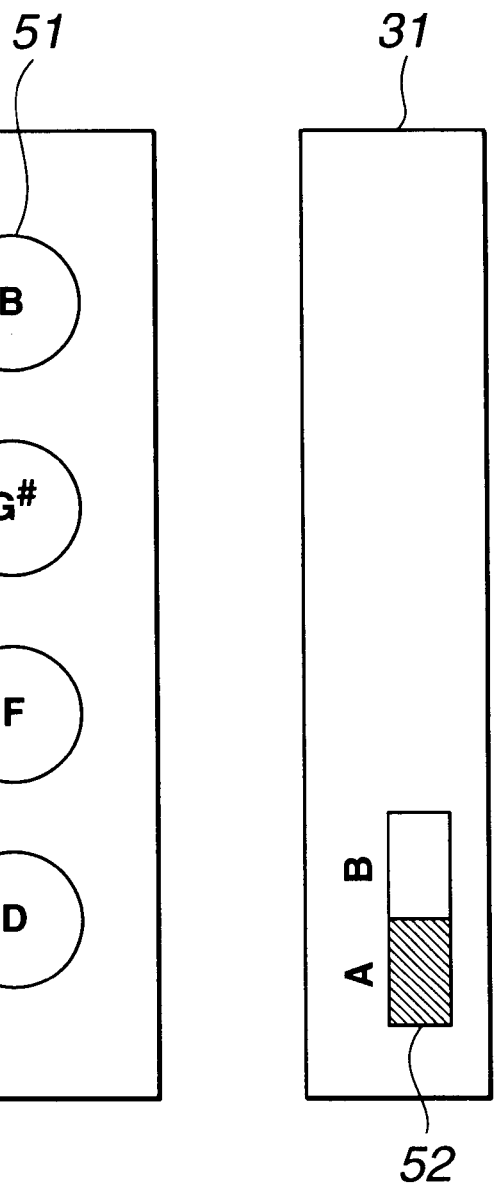
FIG.4A  FIG.4B

| OPERATION | COMBINATION OF SOUND NAMES |
|---|---|
| ADVANCEMENT | DEG# |
| STOP | ABC |
| REVERSAL | DAF |

FIG.8

| NO. | COMBINATION OF SOUND NAMES | SOUND PITCH |
|---|---|---|
| 1 | DEG# | ROBOT UNIT A |
| 2 | ABC | |
| 3 | DAF | |
| 4 | DEG# | ROBOT UNIT B |
| 5 | ABC | |
| 6 | DAF | |

FIG.10

| NO. | COMMAND |
|---|---|
| 1,4 | SCMD_FORWARD |
| 2,5 | SCMD_STOP |
| 3,6 | SCMD_BACKWARD |

FIG.11

| NO.1,4 | C | C# | D | D# | E | F | F# | G | G# | A | A# | B |
|---|---|---|---|---|---|---|---|---|---|---|---|---|
| DEG# |  |  | ■ |  | ■ |  |  |  | ■ |  |  |  |
| D#FA |  |  |  | ■ |  | ■ |  |  |  | ■ |  |  |
| EF#A# |  |  |  |  | ■ |  | ■ |  |  |  | ■ |  |
| FGB |  |  |  |  |  | ■ |  | ■ |  |  |  | ■ |
| CDF# | ■ |  | ■ |  |  |  | ■ |  |  |  |  |  |
| C#D#G |  | ■ |  | ■ |  |  |  | ■ |  |  |  |  |

FIG.12A

| NO.3,6 | C | C# | D | D# | E | F | F# | G | G# | A | A# | B |
|---|---|---|---|---|---|---|---|---|---|---|---|---|
| DAF |  |  | ■ |  |  | ■ |  |  |  | ■ |  |  |
| D#F#A# |  |  |  | ■ |  |  | ■ |  |  |  | ■ |  |
| EGB |  |  |  |  | ■ |  |  | ■ |  |  |  | ■ |
| CD#G | ■ |  |  | ■ |  |  |  | ■ |  |  |  |  |
| C#EG# |  | ■ |  |  | ■ |  |  |  | ■ |  |  |  |

FIG.12B

|       | C | C# | D | D# | E | F | F# | G | G# | A | A# | B |
|-------|---|----|---|----|---|---|----|---|----|---|----|---|
| CDE       | ■ |   | ■ |   | ■ |   |   |   |   |   |   |   |
| C#D#F     |   | ■ |   | ■ |   | ■ |   |   |   |   |   |   |
| DEF#      |   |   | ■ |   | ■ |   | ■ |   |   |   |   |   |
| D#FG      |   |   |   | ■ |   | ■ |   | ■ |   |   |   |   |
| EF#G#     |   |   |   |   | ■ |   | ■ |   | ■ |   |   |   |
| FGA       |   |   |   |   |   | ■ |   | ■ |   | ■ |   |   |
| F#G#A#    |   |   |   |   |   |   | ■ |   | ■ |   | ■ |   |
| GAB       |   |   |   |   |   |   |   | ■ |   | ■ |   | ■ |

FIG.13A

|       | C | C# | D | D# | E | F | F# | G | G# | A | A# | B |
|-------|---|----|---|----|---|---|----|---|----|---|----|---|
| CDF       | ■ |   | ■ |   |   | ■ |   |   |   |   |   |   |
| C#D#F#    |   | ■ |   | ■ |   |   | ■ |   |   |   |   |   |
| DEG       |   |   | ■ |   | ■ |   |   | ■ |   |   |   |   |
| D#FG      |   |   |   | ■ |   | ■ |   |   | ■ |   |   |   |
| D#F#G#    |   |   |   |   | ■ |   | ■ |   | ■ |   |   |   |
| EF#A      |   |   |   |   |   | ■ |   | ■ |   | ■ |   |   |
| FGA#      |   |   |   |   |   |   | ■ |   | ■ |   | ■ |   |

FIG.13B

|       | C | C# | D | D# | E | F | F# | G | G# | A | A# | B |
|-------|---|----|---|----|---|---|----|---|----|---|----|---|
| CD#G      | ■ |   |   | ■ |   |   |   | ■ |   |   |   |   |
| C#EG#     |   | ■ |   |   | ■ |   |   |   | ■ |   |   |   |
| DFA       |   |   | ■ |   |   | ■ |   |   |   | ■ |   |   |
| D#F#A#    |   |   |   | ■ |   |   | ■ |   |   |   | ■ |   |
| EGB       |   |   |   |   | ■ |   |   | ■ |   |   |   | ■ |

FIG.13C

| NO. | COMBINATION OF SOUND NAMES | | SOUND PITCH |
|---|---|---|---|
| 1 | DEG# | RELATIVE MUSICAL SCALE DATA 1 | ROBOT UNIT A |
| 2 | ABC | RELATIVE MUSICAL SCALE DATA 2 | |
| 3 | DAF | RELATIVE MUSICAL SCALE DATA 3 | |
| 4 | DEG# | RELATIVE MUSICAL SCALE DATA 4 | ROBOT UNIT B |
| 5 | ABC | RELATIVE MUSICAL SCALE DATA 5 | |
| 6 | DAF | RELATIVE MUSICAL SCALE DATA 6 | |

FIG.14

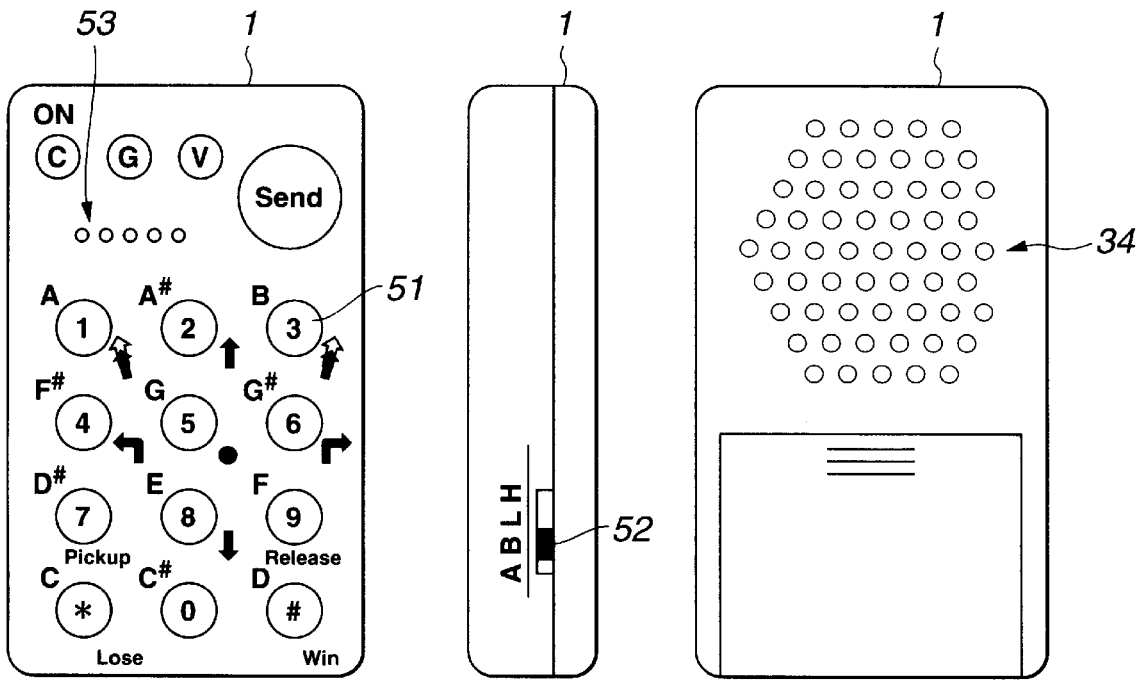

FIG.15A   FIG.15B   FIG.15C

Send: Command Send
C:  Clear Entry/Power On
G:  Game Mode On/Off
V:  Volume High/low
1:  Number 1, Note A or kick Left
2:  Number 2, Note A# or Move Foward
3:  Number 3, Note B or Kick Right
4:  Number 4, Note F# or Rotate Left
5:  Number 5, Note G or Stop
6:  Number 6, Note G# or Rotate Right
7:  Number 7, Note D# or Pickup
8:  Number 8, Note E or Move Backward
9:  Number 9, Note F or Release
0:  Number 0, Note C
*:  Note C or Lose
:  Note D or Win A: Command Type A
B: Command Type B
L: Monotone L
H: Monotone H

OUTLINE OF OPERATION

COMMAND SEQUENCE GENERATOR
1) AFTER COMMAND NO. IS INPUTTED, SEND KEY IS PUSHED DOWN SO THAT SOUND TRAIN IS GENERATED.
BY ALLOWING SEND BUTTON TO BE PUSHED DOWN FOR A SECOND TIME, SOUND TRAIN IMMEDIATELY BEFORE IS RE-GENERATED.
2) IN GAME MODE, SOUND TRAIN IS GENERATED BY SINGLE KEY.
3) MONO-TONE GENERATING FUNCTION EXISTS (C~B, HALFTONE IS PERMITTED).
4) SOUND RANGE IS 523.35Hz (C4)~1975.53Hz (B6)
5) OPERATION MODE, ETC. OF REMOCON SIDE IS DISPLAYED BY LED.
6) AS BUTTON FOR POWER SUPPLY, ON BUTTON IS ONLY PROVIDED. WHEN KEY INPUT IS NOT PROVIDED FOR A PREDETERMINED TIME, POWER SUPPLY IS AUTOMATICALLY TIMES OFF.

MERITS
- SINCE UNIFORM SOUND TRAIN CAN BE GENERATED, RECOGNITION RATIO OF ROBOT IS ENHANCED.
- STORAGE OF MUSICAL SCALE COMMAND AND FAMILIARIZATION OF OPERATION ARE EASIER THAN DEVICE OF KEYBOARD TYPE.
- EASINESS TO USE AS COMMANDER FOR WAGING WAR.
- COMPLICATED SOUND TRAIN CAN BE REPRESENTED BY SIMPLE FIGURES
- THIS DEVICE IS FAVOUR WITH PARTIAL SPECIFIC USERS IN THE SENSE OF POCKET BELL.

FIG.17

LED LIGHT EMITTING STATE
  – FIVE DOUBLE COLOR LIGHT EMITTING LEDS ARE PROVIDED –

○○○○○ All Off      POWER OFF

●●●●● All Green      COMMAND NO. INPUT STANDBY
↓
TO AMBER ONE BY ONE FROM LEFT EVERY KEY INPUT
↓
AFTER SEND IS INPUTTED, STATE SHIFTS TO AMBER FROM LEFT EVERY ONE SOUND
↓
AFTER GENERATION OF SOUND, STATE RETURNS TO ALL GREEN ●○○○○ Green 1      MONO TONE GENERATION INPUT STANDBY
↓
DURING KEY PUSHED DOWN STATE, SOUND IS GENERATED AND AMBER IS TURNED ON
↓
AFTER GENERATION OF SOUND, STATE RETURNS TO LEFT AND GREEN TURNING ON ✶●●●●✶ Green Blink      WAGING WAR MODE A (PLAYER -1)
↓
AT TIME OF GENERATION OF SOUND, STATE SHIFTS TO AMBER FROM LEFT EVERY ONE SOUND
↓
AFTER GENERATION OF SOUND, STATE RETURNS TO BLINK OF GREEN ✶●●●●✶ Amber Blink      WAGING WAR MODE B (PLAYER-2)
↓
AT TIME OF GENERATION OF SOUND, STATE SHIFTS TO GREEN FROM LEFT EVERY ONE SOUND
↓
AFTER GENERATION OF SOUND, STATE RETURNS TO BLINK OF AMBER

FIG.18

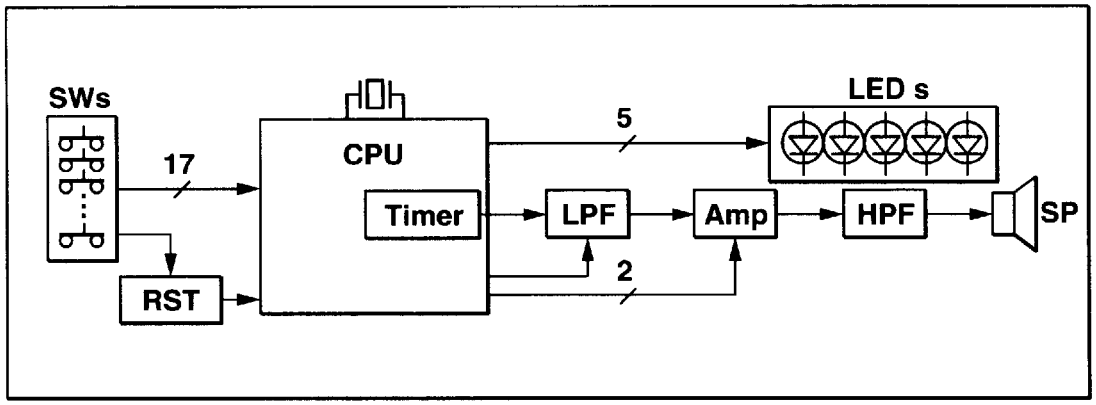

FIG.19A

CPU OPERATION
- AFTER POWER IS TURNED ON OR RESET, CPU IS PLACED IN SWITCH INPUT STANDBY STATE IMMEDIATELY AFTER INTERNAL INITIALIZATION (INITIALIZATION TIME IS SUPPRESSED AS SHORT AS POSSIBLE)
- AS OCCASION DEMANDS, CPU CARRIES OUT LED TURNING ON/ BLINKING IN INPUT STANDBY STATE
- WHEN IT IS DETECTED THAT SWITCH IS PUSHED DOWN, CPU EXECUTES PROCEDURES CORRESPONDING TO RESPECTIVE SWITCHES
- WHEN MONO TONE TO BE GENERATED IS DETERMINED, SUITABLE VALUE IS SET AT TIMER COUNTER WITHIN CPU BY MAKING REFERENCE TO INTERNAL TABLE TO GENERATE RECTANGULAR WAVE
- AT TIME OF GENERATION OF MONO TONE, FILTER CONSTANT AND AMP. GAIN ARE CONTROLLED AS OCCASION DEMANDS
- LEDS WHICH ARE THE SAME AS THOSE AT TIME OF MONO TONE WAVEFORM GENERATION ARE TURNED ON BY SUITABLE PATTERN
- TIME FROM LAST SWITCH INPUT IS MONITORED BY TIMER WITHIN CPU TO ALLOW CPU ITSELF TO BE PLACED IN SLEEP STATE IN CASE WHERE SWITCH INPUT IS NOT PROVIDED FOR PREDETERMINED TIME (ABOUT 60 SEC.) (THIS OPERATION MAY BE UNNECESSARY)
- RETURN FROM SLEEP IS REPLACED BY RESET INPUT

LPF
- HIGH FREQUENCY IS ELIMINATED FROM RECTANGULAR WAVE OUTPUTTED FROM CPU TO ALLOW IT TO BE CLOSE TO SINE WAVE, CHARACTERISTIC IS CONTROLLED (SWITCHED) BY CPU IN ACCORDANCE WITH OCTOVE (PERHAPS UNNECESSARY)

Amp
- AMP. AMPLIFIERS SOUND UP TO NECESSARY SOUND VOLUME. VOLUME IS CONTROLLED (SWITCHED) BY CPU

HPF
- DC COMPONENT AND UNNECESSARY LOWER FREQUENCY ARE ELIMINATED (PERHAPS OK WHEN ONLY DC CUT IS EXECUTED)

FIG.19B

CPU CHARACTERSTIC

ROM/RAM :     T.B.D.

INPUT PORT :     16~20(SWITCH/KEY ENTRY)

OUTPUT :     4 MAX. (SOUND CONTROL, SYSTEM CONTROL)
                    5~6(LED)
                    1 (DIVIDER OUTPUT FROM TIMER/COUNTER)

TIMER/COUNTER :     8 BIT ×2 OR 16 BIT ×1 (WAVE GENERATOR)
                            16 bit ×1(INTERNAL TIMER)

CPU MODE :     NORMAL AND SLEEP

OPE.VOLTAGE :     3V

FIG.20A

Master-> 5000,000Hz

| Note | Hz | DivRate | Div1st | Div2nd | DivRate | Out(Hz) |  | Dif (%) | Dif (Cant) |
|---|---|---|---|---|---|---|---|---|---|
| C | 523.251 | 955.564 | 4 | 239 | 956 | 523.013 | 0.239 | 0.046% | 0.7668 |
| Db | 554.365 | 901.932 | 11 | 82 | 902 | 554.324 | 0.042 | 0.007% | 0.1260 |
| D | 587.330 | 851.311 | 23 | 37 | 851 | 587.544 | -0.215 | -0.037% | -0.6143 |
| Eb | 622.254 | 803.530 | 4 | 201 | 804 | 621.891 | 0.363 | 0.058% | 0.9822 |
| E | 659.255 | 758.432 | 3 | 253 | 758 | 659.631 | -0.375 | -0.057% | -0.9579 |
| F | 698.456 | 715.864 | 4 | 179 | 716 | 698.324 | 0.132 | 0.019% | 0.3189 |
| Gb | 739.989 | 675.886 | 4 | 169 | 676 | 739.645 | 0.344 | 0.046% | 0.7815 |
| G | 783.991 | 637.763 | 11 | 58 | 638 | 783.699 | 0.292 | 0.037% | 0.6260 |
| Ab | 830.609 | 601.968 | 7 | 86 | 602 | 830.565 | 0.045 | 0.005% | 0.0903 |
| A | 880.000 | 568.182 | 4 | 142 | 568 | 880.282 | -0.282 | -0.032% | -0.5383 |
| Bb | 932.328 | 536.292 | 4 | 134 | 536 | 932.836 | -0.508 | -0.055% | -0.9169 |
| B | 987.767 | 506.192 | 2 | 253 | 506 | 988.142 | -0.376 | -0.038% | -0.6396 |
| C | 1,046.502 | 477.782 | 2 | 239 | 478 | 1,046.025 | 0.477 | 0.046% | 0.7668 |
| Db | 1,108.731 | 450.966 | 11 | 41 | 451 | 1,108.647 | 0.083 | 0.007% | 0.1260 |
| D | 1,174.659 | 425.655 | 2 | 213 | 426 | 1,173.709 | 0.950 | 0.081% | 1.3603 |
| Eb | 1,244.508 | 401.765 | 2 | 201 | 402 | 1,243.781 | 0.727 | 0.058% | 0.9822 |
| E | 1,318.510 | 379.216 | 2 | 190 | 379 | 1,319.261 | -0.751 | -0.057% | -0.9579 |
| F | 1,396.913 | 357.932 | 2 | 179 | 358 | 1,396.648 | 0.265 | 0.019% | 0.3189 |
| Gb | 1,479.978 | 337.843 | 2 | 169 | 338 | 1,479.290 | 0.688 | 0.046% | 0.7815 |
| G | 1,567.982 | 318.881 | 11 | 29 | 319 | 1,567.398 | 0.584 | 0.037% | 0.6260 |
| Ab | 1,661.219 | 300.984 | 7 | 43 | 301 | 1,661.130 | 0.089 | 0.005% | 0.0903 |
| A | 1,760.000 | 284.091 | 2 | 142 | 284 | 1,760.563 | -0.563 | -0.032% | -0.5383 |
| Bb | 1,864.655 | 268.146 | 2 | 134 | 268 | 1,865.672 | -1.017 | -0.055% | -0.9169 |
| B | 1,975.533 | 253.096 | 1 | 253 | 253 | 1,976.285 | -0.751 | -0.038% | -0.6396 |
| C | 2,093.005 | 238.891 | 1 | 239 | 239 | 2,092.050 | 0.954 | 0.046% |  |

FIG.20B

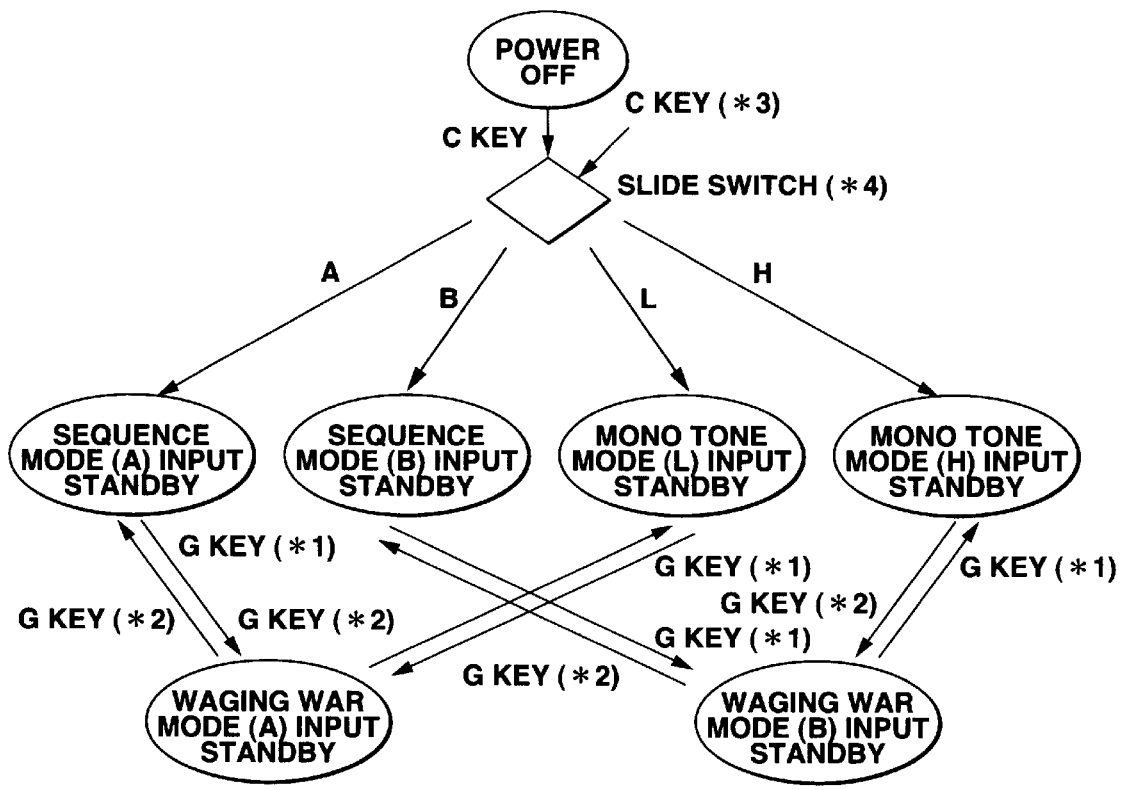

FIG.21A

―(*1) ISSUANCE OF SHIFT COMMAND TO WAGING WAR MODE (GO_GAME MODE) IN CORRESPONDENCE WITH INPUT OF G KEY

―(*2) ISSUANCE OF SHIFT COMMAND TO AUTONOMOUS MODE (GO_AUTONOMOUS MODE) IN CORRESPONDENCE WITH INPUT OF G KEY

―(*3) C KEY IS EQUIVALENT TO RESET KEY. IT CAN BE USED ALSO FOR STOPPING WAGING WAR MADE OF COMMANDER SIDE.

―(*4) SLIDE SWITCH IS MONITORED AT ALL TIMES. WHEN IT IS CHANGED, MODE OF COMMANDER IS IMMEDIATELY SEITCHED (ALSO INCLUDING OPERATION DURING WAGING WAR MODE). IN THIS CASE, ISSUANCE OF MUSICAL SCALE COMMAND IS NOT CARRIED OUT.

- IN RESPECTIVE STANDBY STATES WITH RESPECT TO INPUTS EXCEPT FOR SPECIFIC KEY, OPERATIONS CORRESPONDING TO RESPECTIVE INPUT MODES (GENERATION OF SOUND OF SEQUENCE, ETC.) ARE CARRIED OUT.

- IN CASE WHERE KEY OPERATION IS NOT CARRIED OUT FOR A PREDETERMINED TIME IN RESPECTIVE INPUT STANDBY STATES, POWER IS TURNED OFF.

FIG.21B

CONTROL DEVICE AND METHOD THEREFOR, INFORMATION PROCESSING DEVICE AND METHOD THEREFOR, AND MEDIUM

TECHNICAL FIELD

This invention relates to a control apparatus and a method therefor, an information processing apparatus and a method therefor, and a medium, and more particularly to a control apparatus and a method therefor, an information processing apparatus and a method therefor, and a medium which can easily and securely control plural robot units.

BACKGROUND ART

The applicant of this application has proposed in, e.g., Japanese Patent Application Laid Open No. 335091/1996 publication, a system in which plural sounds of predetermined sound names of sound names referred to as C, D, A . . . are combined to control, e.g., robot apparatus (unit), etc. with the combination (chord) thereof being as one word or sentence.

While, in the previously mentioned proposal, the robot unit can be controlled by sound, there has not yet been provided technology to individually control, in such cases that plural robot units exist, those units when viewed including the previously mentioned proposal.

DISCLOSURE OF THE INVENTION

This invention has been made in such circumstances as described above, and contemplates easily and securely controlling plural robot apparatuses (units).

In more practical sense, a control apparatus according to this invention comprises selector means for selecting a predetermined controlled unit from plural controlled units, input means for inputting combination of plural sounds different in frequency for controlling controlled units, memory means for storing sound pitch information corresponding to the plural controlled units, and generating means for generating sound of combination inputted by the input means of sound pitch corresponding to the controlled unit selected by the selector means. The controlled unit may be robot unit. Moreover, combination of sounds (voices) may be combination of sounds of predetermined sound names within one octave.

Further, a control method according to this invention includes a selection step of selecting a predetermined controlled unit from plural controlled units, an input step of inputting combination of plural sounds different in frequency for controlling controlled units, a memory step of storing sound pitch information corresponding to plural controlled units, and a generation step of generating sound of combination inputted by processing of the input step of sound pitch corresponding to the controlled unit selected by processing of the selection step.

In addition, a medium according to this invention is adapted so that there is recorded program including a selection step of selecting a predetermined controlled unit from plural controlled units, an input step of inputting combination of plural sounds different in frequency for controlling controlled units, a memory step of storing sound pitch information corresponding to plural controlled units, and a generation step of generating sound of combination inputted by processing of the input step of sound pitch corresponding to the controlled unit selected by processing of the selection step.

In the control apparatus, the control method and the medium which have been described above, inputted combined sound of sound pitch corresponding to selected controlled unit is generated.

Moreover, an information processing apparatus according to this invention comprises sound detecting means for detecting sound, sound pitch detecting means for detecting sound pitch of the sound detected by the sound detecting means, combination detecting means for detecting combination of plural sounds different in frequency of sound detected by he sound detecting means, determining means for determining corresponding to detection results of the sound pitch detecting means and the combination detecting means, and execution means for executing processing corresponding to command by the determining means. The information processing apparatus may be robot unit. Further, combination of sounds (voices) may be combination of sounds of a predetermined sound name withing one octave.

Further, an information processing method according to this invention includes a sound detection step of detecting sound, a sound pitch detecting of detecting sound pitch of the sound detected by processing of the sound detection step, a combination detection step of detecting combination of plural sounds different in frequency of the sound detected by processing of the sound detection step, a determination step of determining command corresponding to detection results at the sound pitch detection step and the combination detection step, and an execution step of executing processing corresponding to the command determined by processing of the determination step.

Further, a medium according to this invention is adapted so that there is recorded program including a sound detection step of detecting sound, a sound pitch detection step of detecting sound pitch of the sound detected by processing of the sound detection step, a combination detection step of detecting combination of plural sounds different in frequency of the sound detected by processing of the sound detection step, a determination step of determining command corresponding to detection results at the sound pitch detection step and the combination detection step, and an execution step of executing processing corresponding to the command determined by processing of the determination step.

In the above-described information processing apparatus, information processing method and medium, command corresponding detected sound pitch and combination of sounds is determined. Thus, processing corresponding to the determined command is executed.

In addition, control apparatus according to this invention is directed to a control apparatus adapted for controlling controlled unit controlled on the basis of combined sounds, and comprises input means supplied with a signal, converting means for converting an input signal inputted to the input means into combined sound caused to correspond thereto, and sound output means for outputting combined sounds that the converting means has converted. The controlled unit may be robot unit.

In this control apparatus, such an approach is employed to detect signal from pocket telephone, etc. by input means to convert the detected signal into combined sounds caused to correspond thereto to output it to a robot unit which can be controlled by combined sound by sound output means.

BRIEF DESCRIPTION OF THE DRAWINGS

FIGS. 4A and 4B are views showing an example of the configuration of input section 31 of FIG. 3.

FIG. 8 is a view for explaining the operation of robot unit and combination of sound names.

FIG. 10 is a view showing an example of td.cfg file.

FIG. 11 is a view showing an example of sdata. cfg file.

FIGS. 12A and 12B are views showing sound name of combination considered to be the same in the case where respective sound names of combination are viewed as relative musical scale.

FIGS. 13A to 13C are views showing another example of sound name of combination considered to be the same in the case where respective sound names of combination are viewed as relative musical scale.

FIG. 14 is a view used for explaining table or data base between relative musical scale data and numbers caused to correspond to respective commands.

FIGS. 15A to 15C are a front view, a side view and a back view for explaining a more practical example of robot control unit, respectively.

FIGS. 16A and 16B are views showing contents caused to correspond to respective buttons of the robot control unit.

FIG. 17 is a view for explaining a more practical example of robot system.

FIG. 18 is a view for explaining a more practical example of processing contents of the robot control unit.

FIGS. 19A and 19B are views showing a more practical circuit configuration of the robot control unit and processing contents of constitutional respective portions thereof, respectively.

FIGS. 20A and 20B are views showing characteristic, etc. of CPU.

FIGS. 21A and 21B are views showing respective modes of the robot control unit and processing contents thereof, respectively.

BEST MODE FOR CARRYING OUT THE INVENTION

Explanation will now be given with reference to the attached drawings in connection with the best mode for carrying out the invention.

Figure 1:
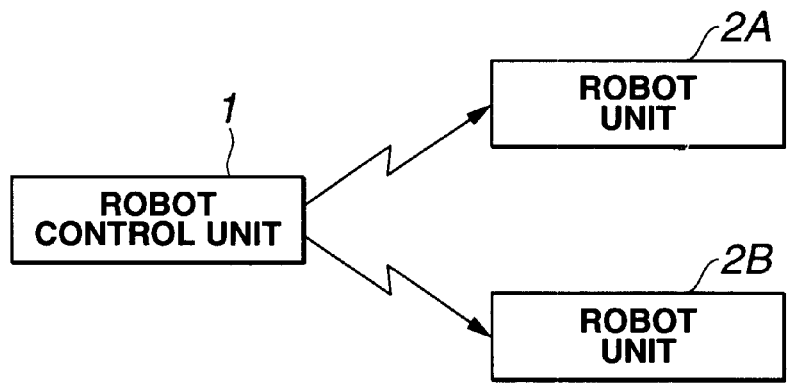
FIG. 1 is a block diagram showing an example of the configuration of robot system to which this invention is applied.

FIG. 1 shows an example of the configuration of robot system to which this invention is applied. In this example of the configuration, a robot control unit 1 is constituted so as to control plural (two in the case of this example) robot units 2A, 2B by sound.

Figure 2:
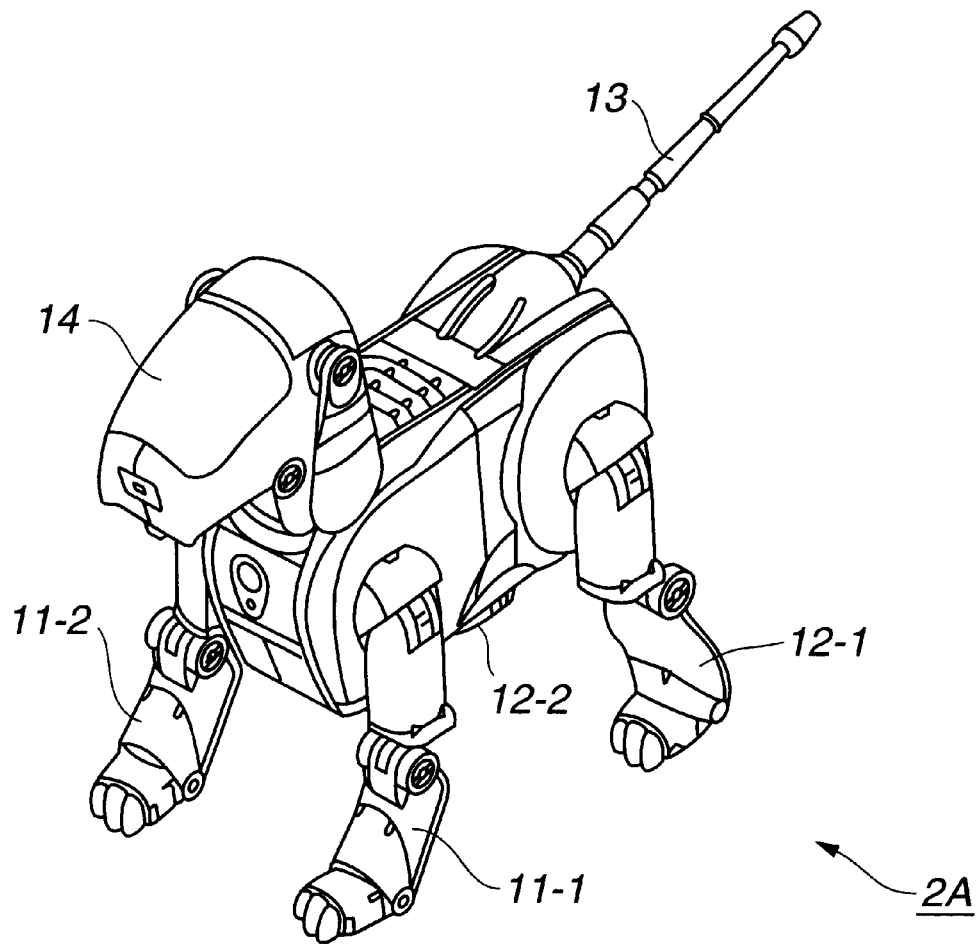
FIG. 2 is a view showing an example of the configuration of appearance of robot device 2A of FIG. 1.

FIG. 2 shows shape of appearance of the robot unit 2A. As shown in this figure, the robot unit 2A is adapted so that it can move in a predetermined direction by forward left and right leg portions 11-1, 11-2 and backward left and right leg portions 12-1, 12-2. Moreover, the robot unit 2A is constituted to swing a tail 13 so that it can give expression to its feelings. LEDs, etc. are included within a display unit 14 so that the state of the inside of the robot unit 2A can be displayed.

Although not shown, the robot unit 2B is also constituted similarly to the robot unit 2A.

Figure 3:
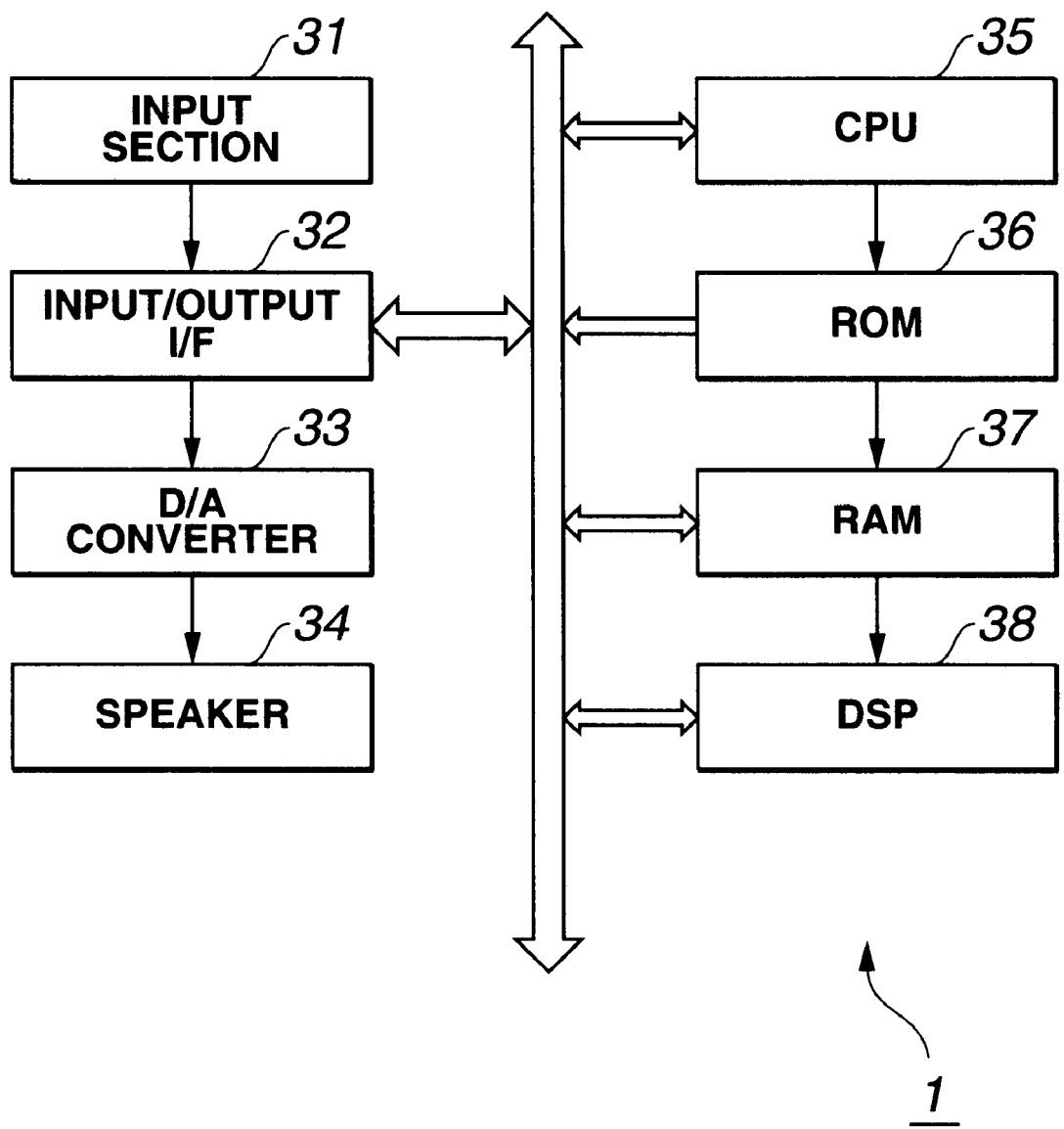
FIG. 3 is a block diagram showing an example of the configuration of the inside of robot control unit 1 of FIG. 1.

The robot control unit 1 is constituted as shown in FIG. 3, for example. The robot control unit 1 is a remote controller for carrying out remote control of the robot unit 2A or the robot unit 2B by sound (voice) output. For example, the robot control device 1 can be also called sound (voice) commander.

An input section 31 is constituted by remote controller including various buttons or keys, and is operated by user when the robot unit 2A or 2B is controlled. An input/output interface 32 carries out processing to interface with an input from the input section 31 to output it to a CPU 35, and to take thereinto audio data inputted from a DSP (Digital Signal Processor) 38 to output it to a D/A converter 33. Thus, audio signal outputted from the D/A converter 33 is outputted from a speaker 34.

The CPU 35 executes various processing in accordance with program stored in a ROM (Read Only Memory) 36. A RAM (Random Access Memory) 37 suitably stores program or data necessary when the CPU 35 executes various processing. The DSP 38 generates audio data corresponding to input from user to output it to an input/output interface I/F 32.

The input section 31 is constituted as shown in FIGS. 4A and 4B, for example. In this example, the input section 31 includes buttons 51 corresponding to 12 kinds of sound names in total of A, A#, B, F#, G, G#, D#, E, F, C, C#, D. Moreover, at the side surface of the input section 31, a slide button 52 is provided. This slide button 52 is adapted so that when the robot unit 2A is controlled, it is switched (positioned) to the left side in the figure (character A side), and when the robot unit 2B is controlled, it is switched (positioned) to the right side (character B side).

Figure 5:
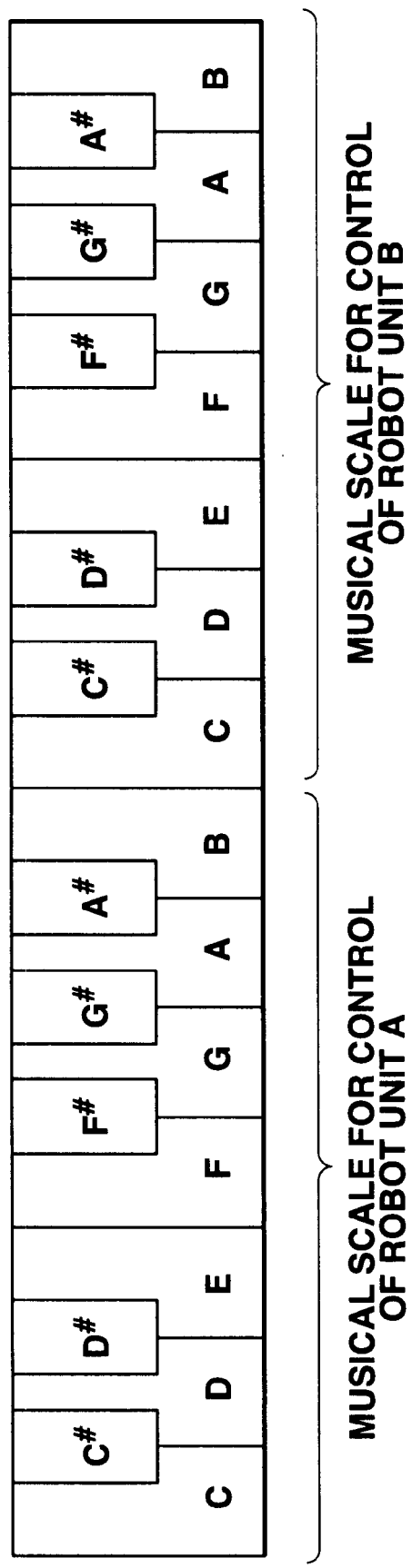
FIG. 5 is a view for explaining musical scale for controlling the robot unit 2A and robot unit 2B.

The DSP 38 generates audio data corresponding to respective 12 kinds of sound names of C to B of lower sound pitch shown at the left side of FIG. 5 in correspondence with operation of the buttons 51 when the slide button 52 is switched to the character A side. On the other hand, the DSP 38 generates audio data of 12 kinds of sound names of C to B of higher sound pitch shown at the right side of FIG. 5.

Figure 6:
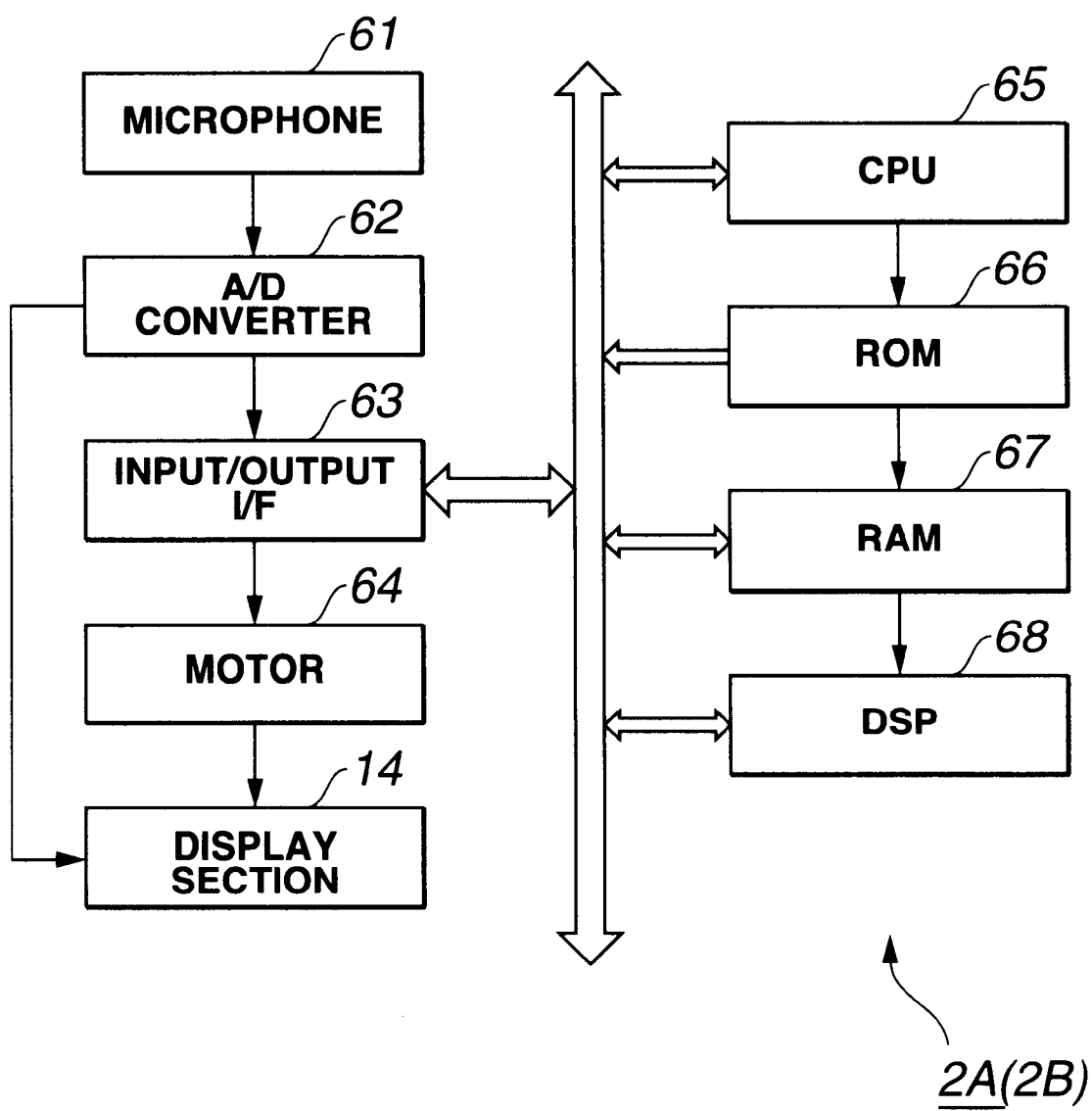
FIG. 6 is a block diagram showing an example of the configuration of the inside of the robot unit 2A of FIG. 1.

FIG. 6 shows an example of the configuration of the inside of the robot unit 2A. A microphone 61 takes thereinto sound that the speaker 34 of the robot control unit 1 has outputted to output it to an A/D converter 62. The A/D converter 62 converts inputted audio signal from analog signal to digital signal to output it to an input/output interface 63. The input/output interface 63 outputs, to the DSP 68, audio data inputted by the A/D converter 62. Moreover, the input/output interface 63 drives a motor 64 in correspondence with control signal from a CPU 65 to drive the leg portions 11-1 to 12-2 and the tail 13 of the robot unit 2A, etc. Further, the input/output interface 63 allows the display section 14 to carry out a predetermined display in correspondence with control from the CPU 65.

The CPU 65 executes various processing in accordance with program stored in the ROM 66. Into a RAM 67, program and/or data necessary when the CPU 65 executes various processing are suitably stored. The DSP 68 analyzes sound pitch and sound name of audio data taken in by the microphone 61 to generate command corresponding to the analyzed result to transfer it to the CPU 65. The CPU 65 interprets this command to control the motor 64 or the display section 14 through the input/output interface 63 as described above in correspondence with the interpreted result.

Although not shown, the configuration of the inside of the robot unit 2B is also constituted similarly to the case of the robot unit 2A.

Figure 7:
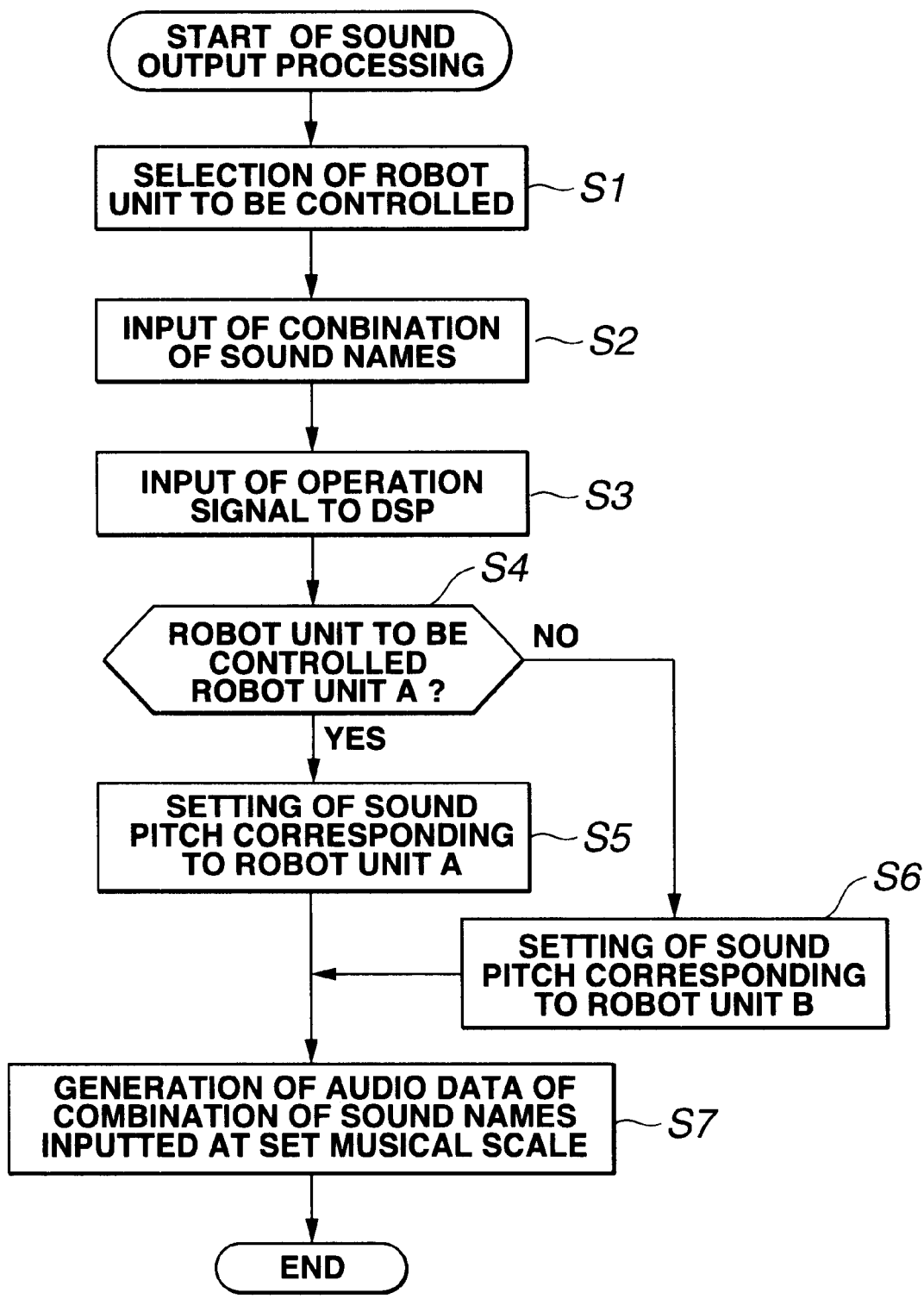
FIG. 7 is a flowchart for explaining the operation of the robot control unit 1 of FIG. 3.

The operation of the robot control unit 1 will now be described with reference to the flowchart of FIG. 7. At step S1, user carries out operation to select robot unit to be controlled. Namely, when the robot unit 2A is controlled, user switches the slide button 52 of the input section 31 is switched to the character A side. When the robot unit 2B is controlled, he switches the slide button 52 to the character B side. Subsequently, at step S2, user inputs, by operating button 51 of the input section 31, combination of sounds of sound names corresponding to command that the robot unit 2A or 2B is caused to be executed.

For example, when the robot unit 2A or 2B is advanced as shown in FIG. 8, user operates respective buttons of sound names D, E, $G^{\#}$ of the buttons 51. Moreover, when the robot unit 2A or 2B is stopped, buttons of sound names A, B, C are operated. Further, when the robot unit 2A or 2B is reversed, buttons 51 of sound names D, A, F are operated.

When the input section 31 is operated, a signal corresponding to that operation is inputted to the CPU 35. When the CPU 35 receives input of signal corresponding to that operation, it outputs a signal corresponding to that operation to the DSP 38 at step S3. The DSP 38 judges, at step S4, on the basis of the signal from the CPU 35 whether or not unit that user intends to control is the robot unit 2A. In the case where the unit to be controlled is the robot unit 2A, the processing procedure proceeds to step S5. Thus, the DSP 38 sets sound pitch corresponding to the robot unit 2A in correspondence with command from the CPU 35 to generate, at step S7, audio data of combination of sounds of sound names inputted from the CPU 35 of the set sound pitch. This audio data is delivered to the input interface 32, and is converted from digital signal to analog signal at the D/A converter 33. The audio data thus obtained is outputted from the speaker 34.

On the other hand, in the case where it is judged at step S4 that the unit to be controlled is not robot unit A (in the case where it is judged that the unit to be controlled is robot unit B), the processing procedure proceeds to step S6. Thus, the DSP 38 sets sound pitch corresponding to the robot unit B. Further, at step S7, there is generated audio data of combination of sounds of inputted sound names at the set sound pitch. This audio data is also outputted from the speaker 34 through the D/A converter 32 from the input/output interface 32 similarly to the above-described case.

In a manner stated above, in the case where the robot unit 2A is controlled, sound consisting of combination of arbitrary sound names of 12 kinds of sound names within one octave indicated at the left side of FIG. 5 is outputted from the speaker 34. On the contrary, in the case where the robot unit 2B is selected as the unit to be controlled, audio data of combination of arbitrary sound names within one octave indicated at the right side in FIG. 5 is outputted from the speaker 34.

Figure 9:
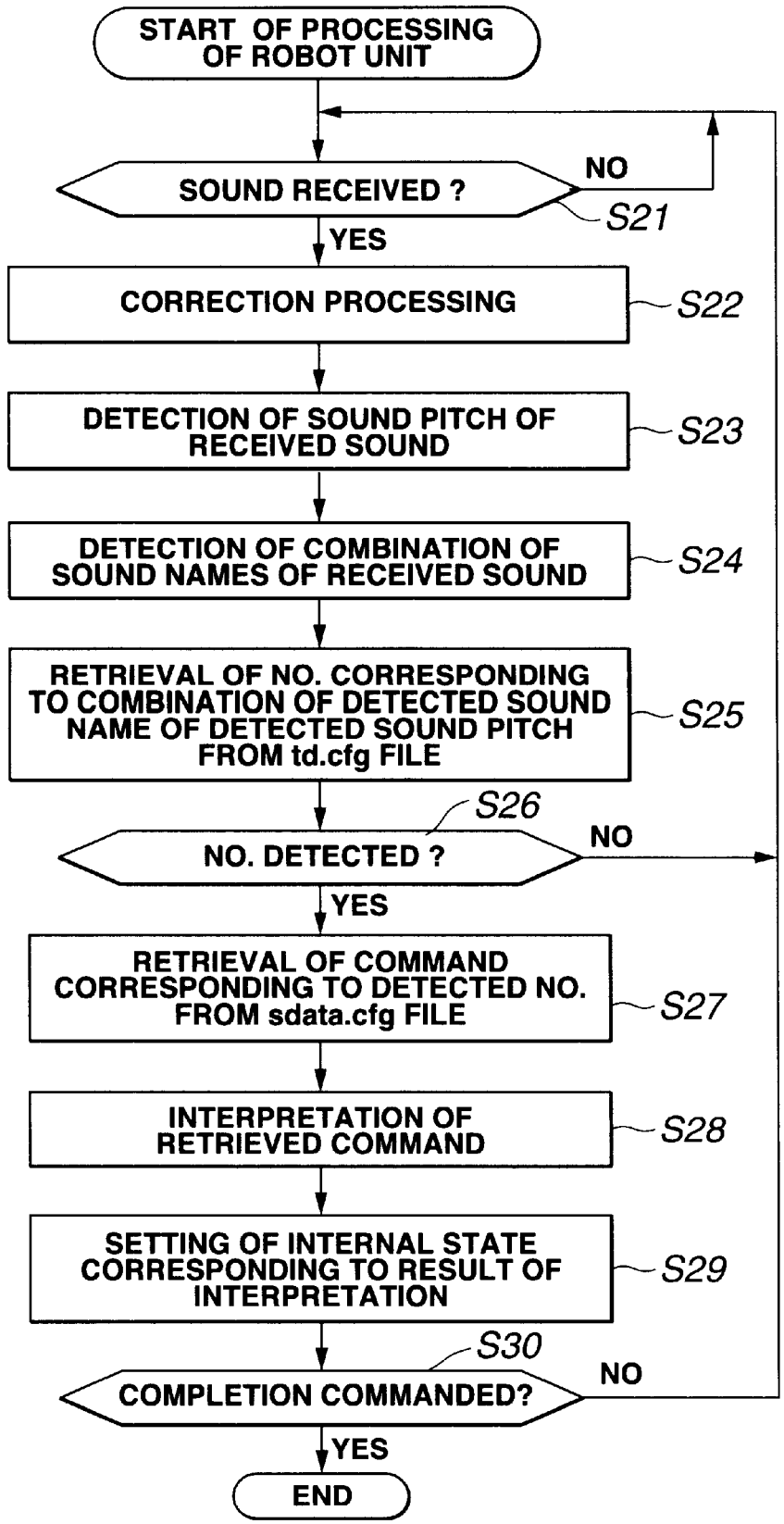
FIG. 9 is a flowchart for explaining the operation of the robot unit 2A of FIG. 6.

The processing of respective robot units in the case where sound is outputted from the robot control unit 1 in this way will be described with reference to the flowchart of FIG. 9.

For example, the robot unit 2A judges at step S21 whether or not audio signal is received. When the audio signal is not received, the processing procedure returns to the step S21 to stand by until the audio signal is received. Namely, when the microphone 61 takes thereinto audio signal, it outputs such an audio signal to the A/D converter 62. The A/D converter 62 converts the audio signal inputted from the microphone 61 into digital signal to output it to the CPU 65 through the input/output interface 63. When audio data is inputted, the CPU 65 transfers it to the DSP 68.

When the audio data is inputted, the DSP 68 carries out correction processing at step S22. Namely, in such cases that there is change (fluctuation) in the sound pitch of inputted audio signal, processing for correcting such change is executed. Further, at step S23, the DSP 68 detects sound pitch of received sound. In addition, at step S24, the DSP 68 detects combination of sound names of received sound.

At step S25, the DSP 68 retrieves, from td.cfg file stored in advance in the ROM 66, number corresponding to combination of sound names detected at the step S24 of the sound pitch detected at the step S23. In this td. cfg file, as shown in FIG. 10, combinations of respective sound names of respective sound pitches are stored. Combination of sound names of sound pitches indicated at numbers 1 to 3 corresponds to combination with respect to the robot unit 2A, and combination of sound names of sound pitches indicated at numbers 4 to 6 corresponds to combination with respect to the robot unit 2B. In this case, sound pitches of sound names caused to correspond to the robot unit A and the robot unit B are allowed to be different from each other.

In this example, as shown in FIG. 8, combinations of sound names are caused to correspond to respective operations of advancement (forward movement), stop and reversal (backward movement), and the combinations of sound names themselves are the same in the robot unit 2A and the robot unit 2B. Whether command is one with respect to the robot unit 2A or the robot unit 2B is discriminated by the sound pitch.

The CPU 65 of the robot unit 2A takes thereinto only data of sound pitches indicated at numbers 1 to 3 of FIG. 10 and the CPU 65 of the robot unit 2B takes thereinto only data of sound pitches indicated at numbers 4 to 6. As a result, in the case where sound pitch detected at the step S23 is sound pitch of the robot unit 2A, and combination of sound names detected at the step S24 is combination of sound names corresponding to command, the DSP 68 of the robot unit 2A detects any one number of numbers 1 to 3 from the td. cfg file. On the contrary, in the case where received audio signal is signal for controlling the robot unit 2B or is merely noise, the DPS 68 cannot detect numbers 1 to 3 from the td. cfg file. In this case, the processing procedure returns to the step S21. Thus, processing subsequent thereto will be repeatedly executed.

On the other hand, the CPU 65 of the robot unit 2B takes thereinto only data of sound pitch indicated at numbers 4 to 6 of FIG. 10. Accordingly, in the case where sound pitch detected at the step S23 is sound picture for the robot unit 2B and combination of sound names detected at the step S24 is combination of sound names stored in the td. cfg file, the DSP 68 of the robot unit 2B can detect any one of numbers 4 to 6.

On the contrary, in the case where audio signal that the robot unit 2B has detected is merely noise, or audio signal for controlling the robot unit 2A, the DSP 68 cannot detect any one of numbers 4 to 6. In this case, the processing procedure returns to the step S21. Thus, processing subsequent thereto will be repeatedly executed.

In the case where it is judged at step S26 that number is detected from td. cfg file, the processing procedure proceeds to step S27. Thus, the DSP 68 retrieves command corresponding to number detected at the step S25 from sdata. cfg file stored in the ROM 66. In this sdata. cfg file, as shown in FIG. 11, command corresponding to number retrieved from the td. cfg. file is stored. The command corresponding to the number 1 or the number 4 is SCMD_FORWARD for advancing robot unit, command corresponding to the number 2 or the number 5 is SCMD_STOP for stopping the robot unit, and command corresponding to the number 3 or the number 6 is command SCMD_BACKWARD for reversing the robot device.

The DSP 68 outputs command retrieved from sdata. cfg file to the CPU 65 at step S28. The CPU 65 interprets command outputted from the DSP 68 and sets the state of the internal corresponding to the interpreted result at step S29.

For example, when the CPU 65 receives input of command SCMD_FORWARD, it controls the motor 64 through the input/output interface 63 to advance the robot unit 2A. When command SCMD_BACKWARD is inputted, the CPU 65 reverses the robot unit 2A. Further, when the command SCMD_STOP is inputted, the CPU 65 stops the robot unit 2A. Moreover, for example, in the case where command SCMD_FORWARD of advancement is inputted, the CPU 65 controls the motor 64 so as to swing the tail 13 for the purpose of expressing joy. Conversely, in the case where command SCMD_BACKWARD of reversal (backward movement) is inputted, the CPU 65 controls the motor 64 so as to downwardly hang the tail 13 for the purpose of expressing feeling of discouragement.

The DSP 68 judges at step S30 whether or not end (completion) of processing is commanded. As a result, when end is not commanded, the processing procedure returns to the step S21. Thus, processing subsequent thereto will be repeatedly executed. In the case where it is judged at step S30 that end is commanded, processing of the robot unit is completed.

While it has been described that combination of sounds is combination of sound names as base sounds of music, if there is employed combination of different frequencies, there may be employed combination of sounds having frequency except for sound corresponding to predetermined sound names.

Moreover, also in the case where there is employed combination of sound names, it is a matter of course that there may be employed sound based on the fact that plural sound names are generated at the same time, so called musical chord or combination of such chords. However, there may be employed combination of sounds which do not constitute chord. For example, such an approach may be employed that control of the robot unit 2A is based on combination of sound names corresponding to black key and control of the robot unit 2B is based on combination of sound names corresponding to white key.

In the case where sound names are combined, not only absolute musical scale may be used as reference, but also relative musical scale may be used as reference. In the case where absolute musical scale is used, e.g., combination of sound names of C, D, E is combination of sound names different from combination of $C^{\#}$, $D^{\#}$, F. On the other hand, in the case where relative musical scale is used, such combination is combination of the same sound names.

For example, in the case the relative musical scale, combination of sound names such as D, E, $G^{\#}$ of the numbers 1 and 4 shown in FIG. 10 can be handled as the same as combination of sound names such as $D^{\#}$, F, A or E, F, $A^{\#}$, etc. as shown in FIG. 12A. Moreover, in the case of the relative musical scale, combination of sound names such as D, A, F of the numbers 3 and 6 shown in FIG. 10 can be handled as the same as combination of sound names such as $D^{\#}$, $F^{\#}$, $A^{\#}$ or E, G, B, etc. as shown in FIG. 12B.

As stated above, even if in the case where respective sound names of combination are viewed as absolute musical scale, they are different from each other, combined sound names are viewed as relative musical scale, thereby making it possible to grasp them as the same one.

It is to be noted that since combination of sound names which prescribes command is not limited to the above-described example, in the case where they are viewed by the example of combination of other sound names, sound names in which relative musical scale is considered to be the same are as shown in FIGS. 13A to 13C.

When such a relative musical scale is used, it becomes easy that the human being utters (produces) command as compared to the case where absolute musical scale is used. Namely, for example, in such cases that the human being produces command by using whistle, only a person who has undergone such musical training can produce sound names of absolute musical scale. On the contrary, in the case where relative musical scale is used, since general user can produce chord if he is not so called tone-deaf, it becomes possible to control robot. Namely, in the case where there is necessity to output sound name of desired combination to control robot unit, even in the case where sound names somewhat deviate from corresponding respective sound names, if they deviate in point of respective sound names and they deviate as a whole, it is possible to process, as the same sound, sound actually produced and musical scale of desired combination when viewed as relative musical scale.

In the case where there is employed combination of sounds of different frequencies except for sound names, it is possible to more finely carry out division as compared to the case where divisions of frequencies of respective sound are constituted by sound names.

For example, it is possible to specify command by relative musical scale as follows.

First, relative musical scale is detected from combination of inputted sounds. Then, command corresponding to the detected relative musical scale is specified. For example, as shown in FIG. 14, there are selected numbers caused to correspond to respective commands from detected relative musical scale by table, data base or file in which relative musical scale data 1 to 6 and numbers 1 to 6 caused to correspond to command are caused to be one set.

In the case where robot unit A is controlled, any one of numbers 1 to 3 is selected on the basis of relative musical scale data. In the case where the robot unit B is controlled, any one of numbers 4 to 6 is selected on the basis of relative musical scale data.

Then, command is retrieved and specified, as explained with reference to FIG. 10 from the selected number.

Thus, in the case where sound name deviates from a desired sound name, the robot unit can grasp combined sound names and a desired control is carried out.

FIGS. 15 to 22 show a more practical example of such robot system.

FIG. 15 shows a more practical example of the robot control unit 1. As shown in FIGS. 15A and 15B, the robot control unit 1 is provided at the front face with respective buttons 51 to which sound names and/or operation commands, etc. are caused to correspond and is at the side surface with slide button 52. As shown in FIG. 15A, the robot control unit 1 is provided with a light emitting section 53 which is light-emitted by operation content of button. The light emitting section 53 is composed of, e.g. plural LEDs. Moreover, the robot control unit 1 is provided as the back face with speaker 34.

Further, FIG. 16A indicates functions caused to correspond to respective buttons 51 of such a robot control unit 1. For example, respective buttons "1", "2", etc. are adapted so that sound names such as A, $A^#$, etc. are caused to correspond thereto, and respective buttons "1", "2" are adapted so that operation instruction (command) such as "left leg kick ("kick Left")", "advancement" "(Move Forward)", etc. in the waging war mode are caused to correspond thereto. Further, FIG. 16B shows function caused to correspond to slide button 52 provided at the side surface portion of the robot control unit 1.

Further, FIG. 17 shows outline of operation in the robot system. The content of the command sequence generator and its merits are as shown in FIG. 17.

Further, FIG. 18 shows a more practical example of processing content of the robot control unit. In the figure, the content of the processing step is shown at the right side, and light-emitting state of the light emitting section corresponding to its processing step is shown at the left side.

Further, FIG. 19A shows a more practical circuit configuration of the robot control unit 1, and FIG. 19B shows the processing contents of respective components. Further, FIGS. 20A and 20B are views showing characteristic, etc. of CPU.

Further, the robot control unit 1 is caused to be of configuration capable of executing respective mods of the robot unit, and transitions to respective modes are shown in FIG. 21A. FIG. 21B is a view for explaining, in more practical sense, respective modes, etc.

In addition, robot control unit for controlling robot units is not limited to the above-described example.

For example, the robot control device may be composed of input means supplied with signal, converting means for converting the input signal inputted to the input means into the combined voice caused to correspond thereto, and sound output means for outputting combined sound that the converting means has converted.

The input means is portion supplied with signal by wire or radio. For example, signal from pocket telephone is inputted to the input means and the input means detects such a signal.

The converting means converts input signal inputted to the input means by wire or radio in such a manner stated above into combined sound names caused to correspond thereto. For example, table is used to convert input signal into combined sounds caused to correspond thereto.

The sound output means is, e.g., speaker and output combined sound name converted by the converting means.

For example, the configuration of such a robot control unit may be realized by providing the above-described converting means at the so-called headphone.

By constituting the robot control unit in a manner as stated above, user can carry out remote control of the robot unit by signal from pocket telephone, e.g., even if he is not present in the vicinity of the robot unit. Thus, it becomes possible to control robot units 2A, 2B with higher entertainment or amusement.

In addition, while the above-described series of processing can be executed by hardware, such processing may be executed by software. In the case where a series of processing are executed by software, program constituting its software may be installed into computer assembled into the robot control unit or the robot unit as dedicated hardware, or, e.g., widely used personal computer capable of executing various functions by installing various programs.

Explanation will be given, with reference to FIG. 22, with the case where that computer is widely used personal computer being as example in connection with medium adapted sop that program for executing the above-described series of processing is installed into computer and used for a allowing such program to be placed in executable state by the computer.

Figure 22A:
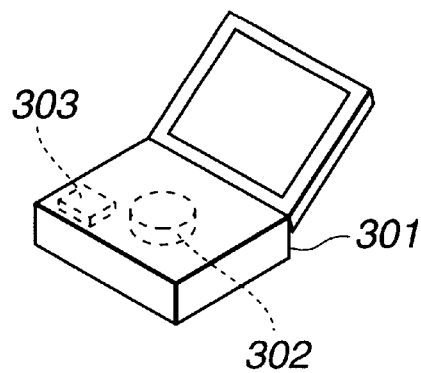
FIGS. 22A to 22C are views for explaining medium.

Program can be provided, as shown in FIG. 22A, with respect to user in the state where it is installed in advance with respect to hard disc 302 or semiconductor memory 303 as recording medium included within computer 301.

Figure 22B:
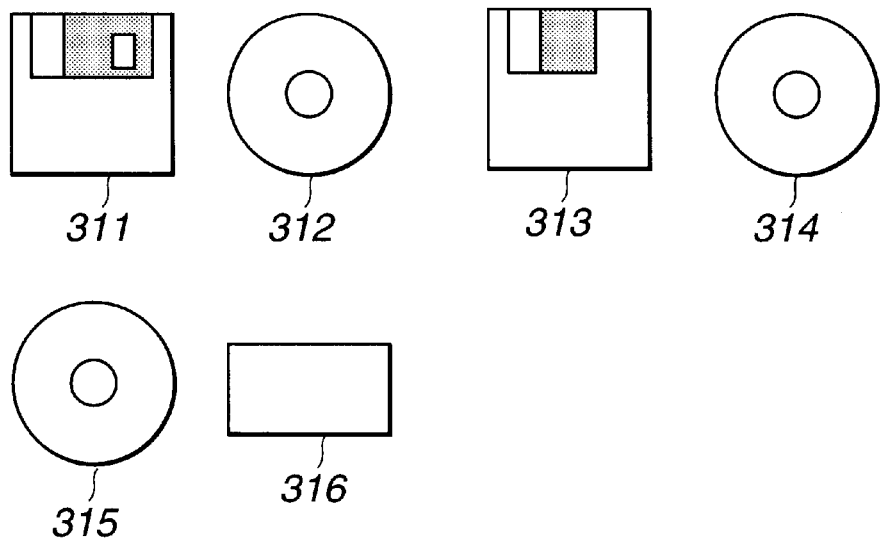

Alternatively, program may be temporarily or permanently stored, as shown in FIG. 22B, with respect to floppy disk 311, CD-ROM (Compact Disk Read Only Memory) 312, MO (Magneto-Optial) disk 313, DVD (Digital Versatile Disk)314, magnetic disk 315, or semiconductor memory 315, etc., and may be provided as package software.

Figure 22C:
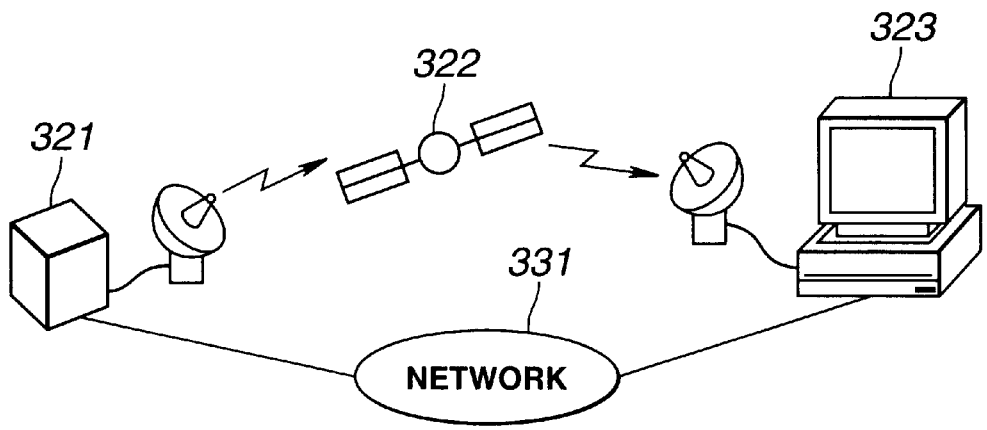

Further, as shown in FIG. 22C, program may be transferred by radio to computer 323 through artificial satellite 322 for digital satellite broadcast from down load site 321, or may br transferred by wire to computer 323 through network 331 such as local area network or internet and may be stored with respect to hard disk included within the computer 323.

The medium in this specification means broad concept including these all media.

In addition, in this specification, steps for describing program provided by medium include not only processing carried out in time series manner along the order described, but also processing executed in parallel or individually even if such program is not processed in time series manner.

It is to be noted that, in this specification, system indicates the entirety of the apparatus constituted by plural units.

What is claimed is:

1. A control apparatus for controlling plural controlled units, comprising:

selector means for selecting a predetermined controlled unit from the plural controlled units;

input means for inputting combination of plural sounds different in frequency for controlling the controlled units;

memory means for storing sound pitch information corresponding to the plural controlled units; and generating means for generating sound of combination inputted by the input means of the sound pitch corresponding to the controlled unit selected by the selector means.

2. The control apparatus as set forth in claim 1, wherein the controlled unit is a robot unit.

3. The control apparatus as set forth in claim 1, wherein the combination of sounds is the combination of sounds of predetermined sound names within one octave.

4. The control apparatus as set forth in claim 1, wherein the generating means generates sounds of combination as time series.

5. The control apparatus as set forth in claim 1, wherein the generating means generates sounds of combination at the same time to generate chord.

6. The control apparatus as set forth in claim 5, wherein the generating means generates the chord of combination of time series.

7. A control method for a control apparatus adapted to control plural controlled units, comprising;
   a selection step of selecting a predetermined controlled unit from the plural controlled systems;
   an input step of inputting combination of plural sounds different in frequency for controlling the controlled units;
   a memory step of storing sound pitch information corresponding to the plural controlled units; and
   a generation step of generating sounds of combination inputted by processing of the input step of sound pitch corresponding to the controlled unit selected by processing of the selection step.

8. A medium for allowing computer to execute a program for controlling plural controlled units,
   the program including:
      a selection step of selecting a predetermined controlled unit from the plural controlled units;
      an input step of inputting combination of plural sounds different in frequency for controlling the controlled units;
      a memory step of storing sound pitch information corresponding to the plural controlled units; and
      a generation step of generating sound of combination inputted by processing of the input step of sound pitch corresponding to the controlled unit selected by processing of the selection step.

9. An information processing apparatus comprising:
   sound detecting means for detecting sound;
   sound pitch detecting means for detecting sound pitch of the sound detected by the sound detecting means;
   combination detecting means for detecting combination of plural sounds different in frequency of the sound detected by the sound detecting means;
   determining means for determining command corresponding to detection results of the sound pitch detecting means and the combination detecting means; and
   execution means for executing processing corresponding to the command determined by the determining means.

10. The information processing apparatus as set forth in claim 9, wherein the information processing apparatus is a robot unit.

11. The information processing apparatus as set forth in claim 9, wherein the combination of the sound is the combination of sounds of predetermined sound names within one octave.

12. The information processing apparatus as set forth in claim 9, wherein the combination detecting means detects relative musical scale different in frequency; and
wherein the determining means determines corresponding command with reference to detection result of the sound pitch detecting means and the relative musical scale which is detection result of the combination detecting means.

13. An information processing method comprising:
   a sound detection step of detecting sound;
   a sound pitch detection step of detecting sound pitch of the sound detected by processing of the sound detection step;
   a combination detection step of detecting combination of plural sounds different in frequency of the sound detected by processing of the sound detection step;
   a determination step of determining command corresponding to detection results at the sound pitch detection step and the combination detection step; and
   an execution step of executing processing corresponding to the command determined by processing of the determination step.

14. A medium for allowing computer to execute program,
   the program including:
      a sound detection step of detecting sound;
      a sound pitch detection step of detecting sound pitch of the sound detected by processing of the sound detection step;
      a combination detection step of detecting combination of plural sounds different in frequency of the sound detected by processing of the sound detection step;
      a determination step of determining command corresponding to detection results at the sound pitch detection step and the combination detection step; and
      an execution step of executing processing corresponding to the command determined by processing of the determination step.

15. A control apparatus adapted for controlling controlled unit controlled on the basis of combined sounds, the control apparatus comprising:
   input means supplied with a signal;
   converting means for converting the input signal inputted to the input means into the combined sounds caused to correspond thereto; and
   sound output means for outputting the combined sounds converted by the converting means.

16. The control apparatus as set forth in claim 15, wherein the controlled unit is a robot unit.

* * * * *